United States Patent [19]

Bui et al.

[11] Patent Number: 5,564,027
[45] Date of Patent: Oct. 8, 1996

[54] LOW LATENCY CADENCE SELECTABLE INTERFACE FOR DATA TRANSFERS BETWEEN BUSSES OF DIFFERING FREQUENCIES

[75] Inventors: Hai Q. Bui, Austin; Sean E. Curry, Pflugerville; Bernard C. Drerup, Austin, all of Tex.

[73] Assignee: International Business Machines Corporation, Armonk, N.Y.

[21] Appl. No.: 425,811

[22] Filed: Apr. 20, 1995

[51] Int. Cl.⁶ .................................. G06F 13/42
[52] U.S. Cl. ................... 395/309; 395/308; 395/855; 395/550
[58] Field of Search ..................... 395/306, 307, 395/308, 309, 310, 855, 550

[56] References Cited

U.S. PATENT DOCUMENTS

| | | |
|---|---|---|
| 4,378,588 | 3/1983 | Katzman et al. . |
| 4,389,720 | 6/1983 | Baxter et al. . |
| 4,593,281 | 6/1986 | Lare . |
| 4,847,812 | 7/1989 | Lodhi . |
| 5,029,124 | 7/1991 | Leahy et al. . |
| 5,043,883 | 8/1991 | Inouchi et al. . |
| 5,081,609 | 1/1992 | Getson, Jr. et al. . |
| 5,151,985 | 9/1992 | Sander et al. . |
| 5,191,653 | 3/1993 | Banks et al. ............. 395/293 |
| 5,191,657 | 3/1993 | Ludwig et al. .......... 395/306 X |
| 5,228,129 | 7/1993 | Bryant et al. . |
| 5,228,134 | 7/1993 | MacWilliams et al. . |
| 5,239,636 | 8/1993 | Dujari et al. . |
| 5,241,666 | 8/1993 | Idleman et al. . |
| 5,255,374 | 10/1993 | Aldereguia et al. .......... 395/307 X |
| 5,255,378 | 10/1993 | Crawford et al. ............. 395/307 |
| 5,261,064 | 11/1993 | Wyland . |
| 5,404,462 | 4/1995 | Datwyler et al. ............ 395/308 |
| 5,422,914 | 6/1995 | Snyder ........................ 375/354 |
| 5,455,915 | 10/1995 | Coke .......................... 395/293 |

FOREIGN PATENT DOCUMENTS 0365116  4/1990  European Pat. Off. .

Primary Examiner—Jack B. Harvey
Assistant Examiner—Glenn A. Auve
Attorney, Agent, or Firm—Casimer K. Salys

[57] ABSTRACT

A bus interface with resources to selectively optimize burst mode data transfers from one bus to another through an automated selection and generation of a cadence. In one form, the cadence is selected based upon memory access latency characteristics, the relative widths of the busses, and the relative clock frequencies of the busses. The selected cadence is provided as a pacing ready signal to the bus receiving the transferred data.

6 Claims, 6 Drawing Sheets

LOW LATENCY CADENCE SELECTABLE INTERFACE FOR DATA TRANSFERS BETWEEN BUSSES OF DIFFERING FREQUENCIES

BACKGROUND OF THE INVENTION

The present invention generally relates to interfaces between digital data processing system busses. More particularly, the invention is directed to apparatus and methods for controlling the transfer of data from one bus to another bus, where the bus data widths and bus frequencies differ.

The designs of digital computers and workstations continue to evolve at a rapid pace as new processors (microprocessors/CPUs) become available and are integrated with input/output (I/O) resources into advanced versions of such is systems. Though the widths of the multiple busses commonly present in such systems often vary from model to model, the prevailing and evolutionary changes between models tend to be associated with the clock rates of the processors. Namely, it is very common for a fundamental system design to be upgraded with faster processors in half year or less increments of a model's life cycle. The problem is that the system boards are designed with busses and associated hardware which operate over a first relative frequency range while the processor clock frequencies vary over a second range of fundamentally higher frequencies. This has created a need for a versatile interface system, one which efficiently mates input/output bus architectures with processor bus architectures, as processor clock frequencies change.

The present invention is particularly suited to the transfer of data between busses, when the transfer is accomplished in a burst protocol using a memory controller which provides data in beats at a set pace. For example, the interface may be between a processor bus (having a processor, a main memory, and a memory controller connected thereto), and an I/O bus, such as the commercially prevalent peripheral control interface (PCI) bus. In such context it is common to have a PCI bus master use a burst protocol to rapidly access successively stored data in the main memory. However, since processor clock frequencies and memory access latencies change frequently, while the basic PCI bus standard is relatively fixed, there is a need for a flexible interface.

Controlling the transfer of data in burst mode from a memory on a processor bus to a bus master on a PCI bus has typically been accomplished in one of two ways. The first technique involves the use of an interlock, pacing the transfer of each individual word of data from the memory to the PCI bus master. The interlock requires that the PCI bus master wait when the data is not available, and continue the data read operations when the data becomes available. This technique unfortunately requires complex interlock control logic and "wait state" delays to accomplish the necessary handshaking. The logic is affected by the PCI bus master capabilities, the sizes of the data bus widths and the different main memory access latencies.

The second method of controlling data flow between busses during a burst mode read from processor memory involves the use a multiword buffer to store the passed blocks of data. In this practice, the PCI bus master accesses the buffer when the buffer becomes full. This technique avoids basic problems attributable to evolutionary changes in the clock frequency of the CPU bus and is simple to control. However, it hinders performance because the PCI bus master is required to wait until the entire block of data is buffered before beginning access. Furthermore, the "wait" imposed oh the PCI bus master may violate the PCI specification if the period exceeds the maximum permitted for data latency.

What is needed is a flexible bus interface system which can optimize burst mode data transfers from a memory on a processor bus to a PCI type I/O bus master, taking into account differences in bus width, differences in the bus clock frequencies, the effects of memory access latency, and evolutionary changes in the processor bus clock frequencies.

SUMMARY OF THE INVENTION

The present invention optimizes data flow between a first data processing bus and a second data processing bus, the busses being operable at different clock frequencies, through the provision of interface apparatus which provides efficient transfers of data between the busses using a plurality of data transfer cadences, means for determining a relative data transfer rate between the first and second data busses, means for selecting a transfer cadence from the plurality of cadences responsive to the determination of a relative data transfer rate, and means for providing pacing signals to the second bus responsive to the selected transfer cadence. In another form, the invention is directed to processes performed by the interface apparatus described above.

In one form, the improved data flow control is accomplished through the use of a selectable cadence, the selected being determined on the basis of the relative bus widths, the relative bus frequencies and the memory access latency. The cadence generates a pacing signal which enables the bus master on the PCI bus at appropriate intervals to access data stored in a FIFO buffer connected between the processor and PCI data busses. The FIFO buffer is deep enough to store the data in at least one burst transfer from the memory.

The PCI bus master is paced at the rate and in the sequence established for the selected cadence. The signal sequences for each of the selectable cadences are predefined to optimize data transfers for the corresponding combinations of bus sizes, bus clock frequencies and memory access latencies. The pacing signal appears as a WAIT/CONTINUE signal On the PCI bus. The CONTINUE state of the signal informs the PCI bus master that valid data is available on the PCI bus.

These and other features of the invention will be more clearly understood and appreciated upon considering the detailed embodiment described hereinafter.

DESCRIPTION OF THE PREFERRED EMBODIMENT

Figure 1:
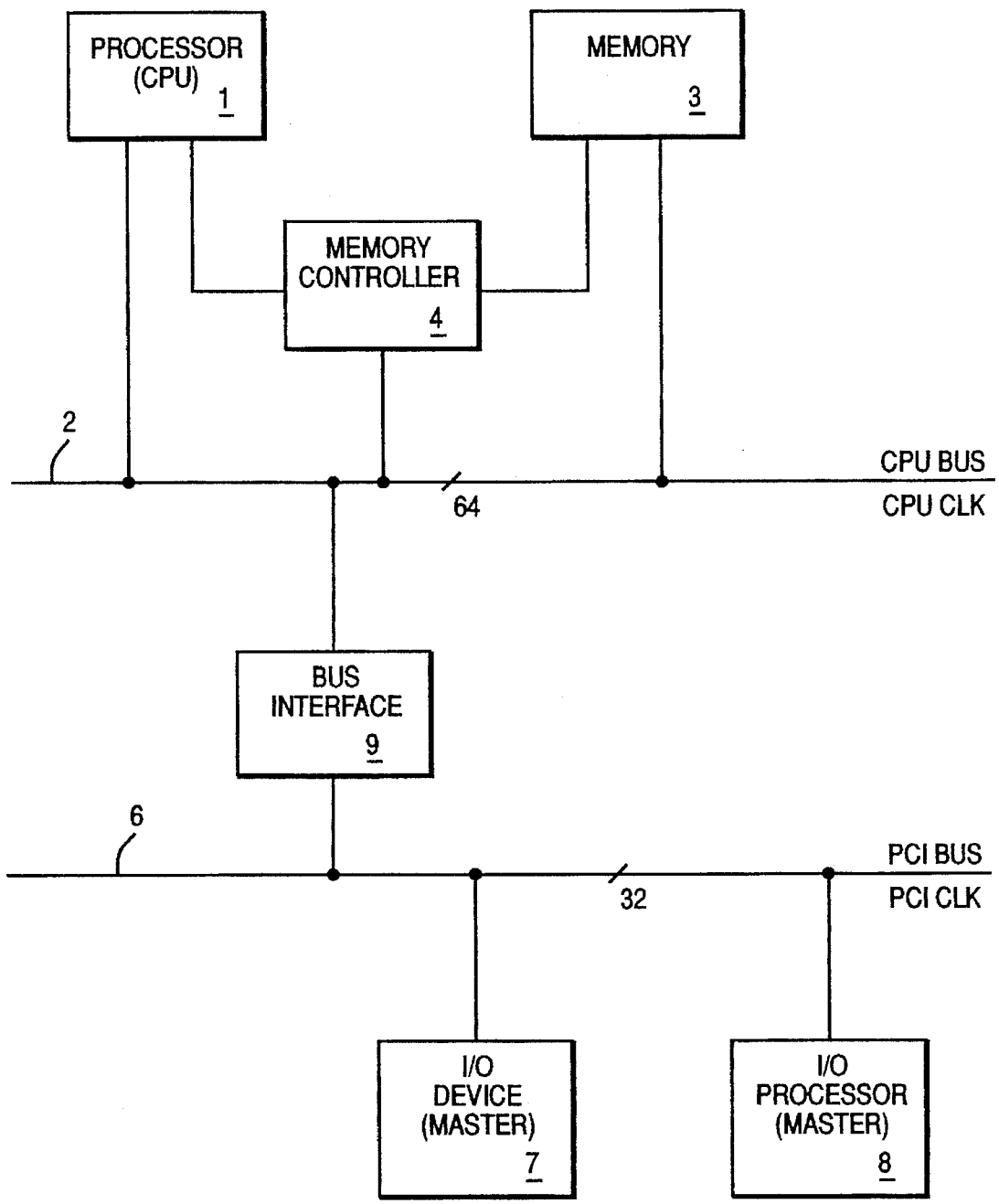
FIG. 1 is a schematic block diagram of a personal computer or workstation bus architecture.

FIG. 1 depicts by functional blocks a personal computer or workstation digital data processing architecture of the form to which the present invention pertains. As shown, the system includes a processor (CPU) 1 connected to a 64 bit wide processor bus 2 operating at the processor clock frequency. Also connected to processor bus 2 is DRAM type system memory 3 and associated memory controller 4, the controller having conventional direct memory access (DMA) resources. Though not shown, memory 3 will likely include one or levels of cache operable at the speed of the processor clock. Also, it should be recognized that processor bus 2 may extend to include multiple processors, as is common in contemporary server computers.

The various forms of systems to which the present invention pertains normally have an input/output bus, such as peripheral Controller interface (PCI) bus 6, as another aspect of the bus architecture. The PCI bus standard presently Specifies a bus width of 32 bits and a maximum frequency of 33 MHz. Though refinements are being considered, this represents the present worst case requirement for the PCI bus. PCI bus 6 is shown to have connected thereto various I/O devices and processors 7 and 8. These are intended to be generic depictions in that the I/O devices can be processor systems in their own right, or connections to further levels of I/O bus, such as EISA busses or even further PCI busses.

The focus of the present invention is on the functions performed in bus interface 9. The PCI bus for purposes of the embodiment herein has a 32 bit data width and the common design point operating 7 frequency of 33 Mhz. Processor 1 as presently embodied uses a clock rate of 66 Mhz. A commercial example of such processor is the PowerPC 604 (TM) available from IBM Corporation. The remaining variable affecting the operations of bus interface 9 is the memory access latency which paces the read rate of data from memory 3 onto CPU bus 2. As embodied in the first example, memory 3 provides data every sixth CPU clock cycle. A later example illustrates operation with a memory exhibiting a one-in-four CPU clock cycle access latency.

Figure 2:
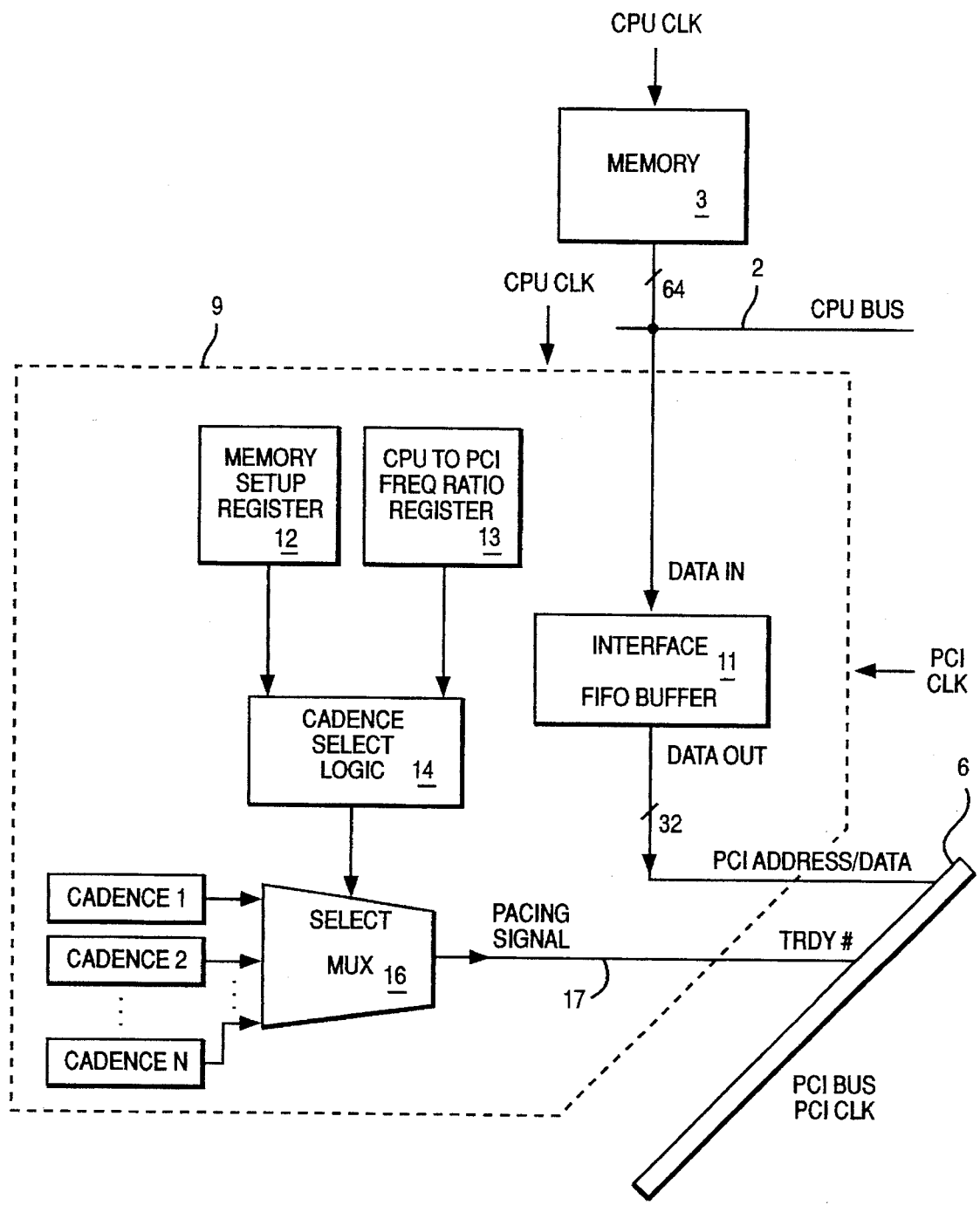
FIG. 2 is a schematic block diagram of a general selectable cadence interface.

FIG. 2 depicts a functional level first embodiment of bus interface 9. As shown in FIG. 2, interface 9 includes interface FIFO buffer 11 connected between CPU bus 2 and PCI bus 6. Data entering FIFO 11 is received from CPU bus 2 in a 64 bit wide format, while the output data from FIFO 11 is in the 32 bit width of PCI bus 6. Interface 9 also includes memory set-up register 12, which register receives and stores main memory access latency and configuration information. The information in register 12 specifies the memory read repetition rate in terms of the CPU clock rate. Ratio register 13 is loaded with data representing the frequency ratio between the CPU bus clock and the PCI bus clock. This ratio reflects the relative higher speed of the CPU bus. Based upon the data in registers 12 and 13, cadence select logic 14 selects a cadence to optimally match the operations of the two busses during high speed, burst mode, transfers of data from memory 3 to a bus master connected on PCI bus 6. The selection of the cadence is accomplished by multiplexer 16. The selection appears as a pacing signal represented by WAIT/CONTINUE voltage states on line 17, Where line 17 is connected to the TRDY# line of the PCI bus.

Figure 3:
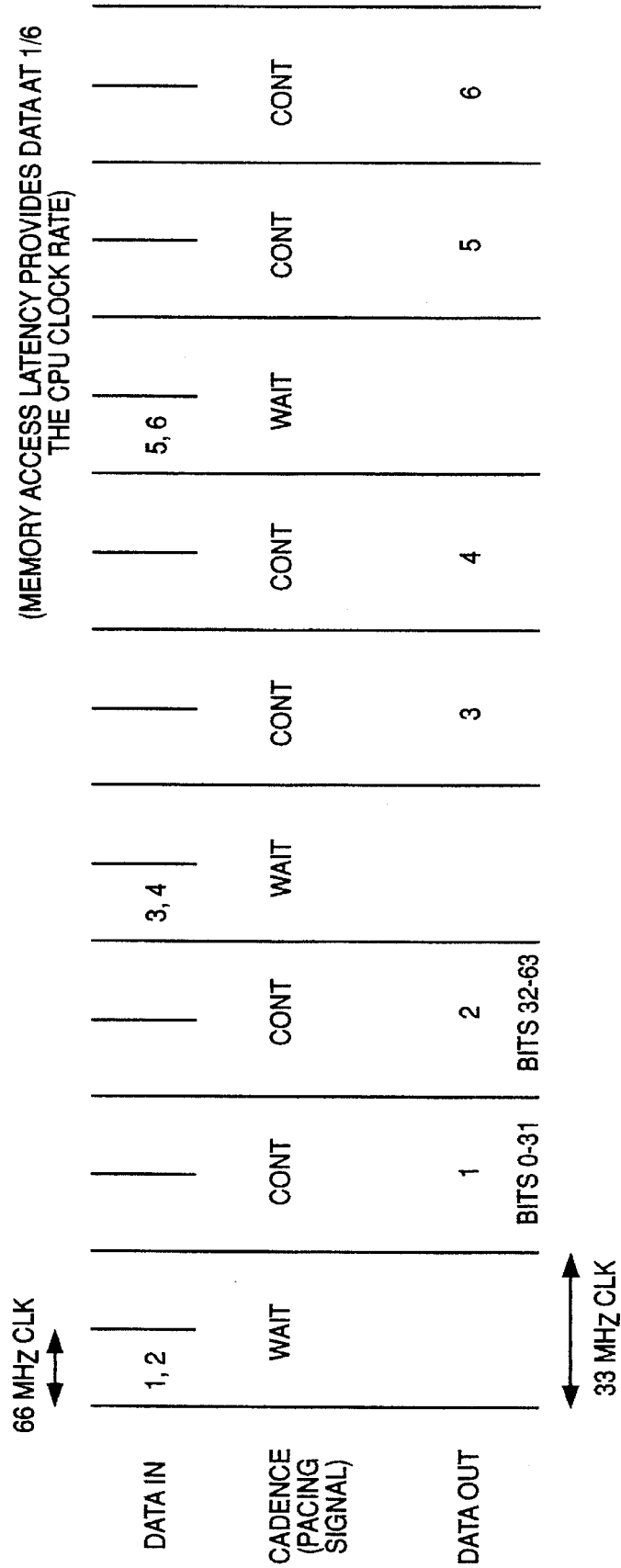
FIG. 3 is a timing diagram schematically depicting a data transfer sequence for an example cadence.

A generalized data transfer example is depicted in the timing diagram Of FIG. 3. For purposes of the Fig. 3, the CPU bus clock rate is presumed to be 66 Mhz while the PCI bus clock rate is at 33 Mhz. The CPU data bus width is defined as 64 bits, while the PCI bus has the aforementioned 32 bit data bus width. Lastly, the memory access latency provides that read data from the memory will be available once for each 6 CPU clock cycles. The objective is to optimize the burst mode transfer of data from the CPU bus situated memory to a PCI bus situated bus master. The PCI bus device is presumed to be a master since it must monopolize the bus during the full duration of the burst mode data transfer.

Referring to FIG. 3, a 64 bit string of data, shown as a combination of two 32 bit strings, appears as Data In at FIFO 11 (FIG. 2) during the first interval (the first 33 MHz clock cycle) of the cadence sequence. During such interval, the pacing signal to the TRDY# line of the PCI bus is at a WAIT state level. During the next interval of the cadence, the signal to the PCI bus changes a CONTINUE level. The CONTINUE level notifies the PCI bus master that valid data is present on the PCI bus. This initiates a PCI bus master read of the first 32 bit word of data provided by the FIFO. During the next PCI clock cycle, the cadence again defines a CONTINUE level signal for the PCI bus. This CONTINUE signal initiates the read of the second 32 bit word of data provided by the FIFO. Thereafter, the cadence repeats with the next 64 bit word of data from main memory in an analogous input and output succession. The selected cadence is repeated until the burst transfer is completed.

The cadence depicted in FIG. 3 is selected to optimize the transfer of data for the design conditions defined, namely the bus widths, the bus clock rates and the memory access latency parameters. If any of the parameters change, a different cadence, which matches the new characteristics, will be selected for subsequent data transfers.

Figure 4:
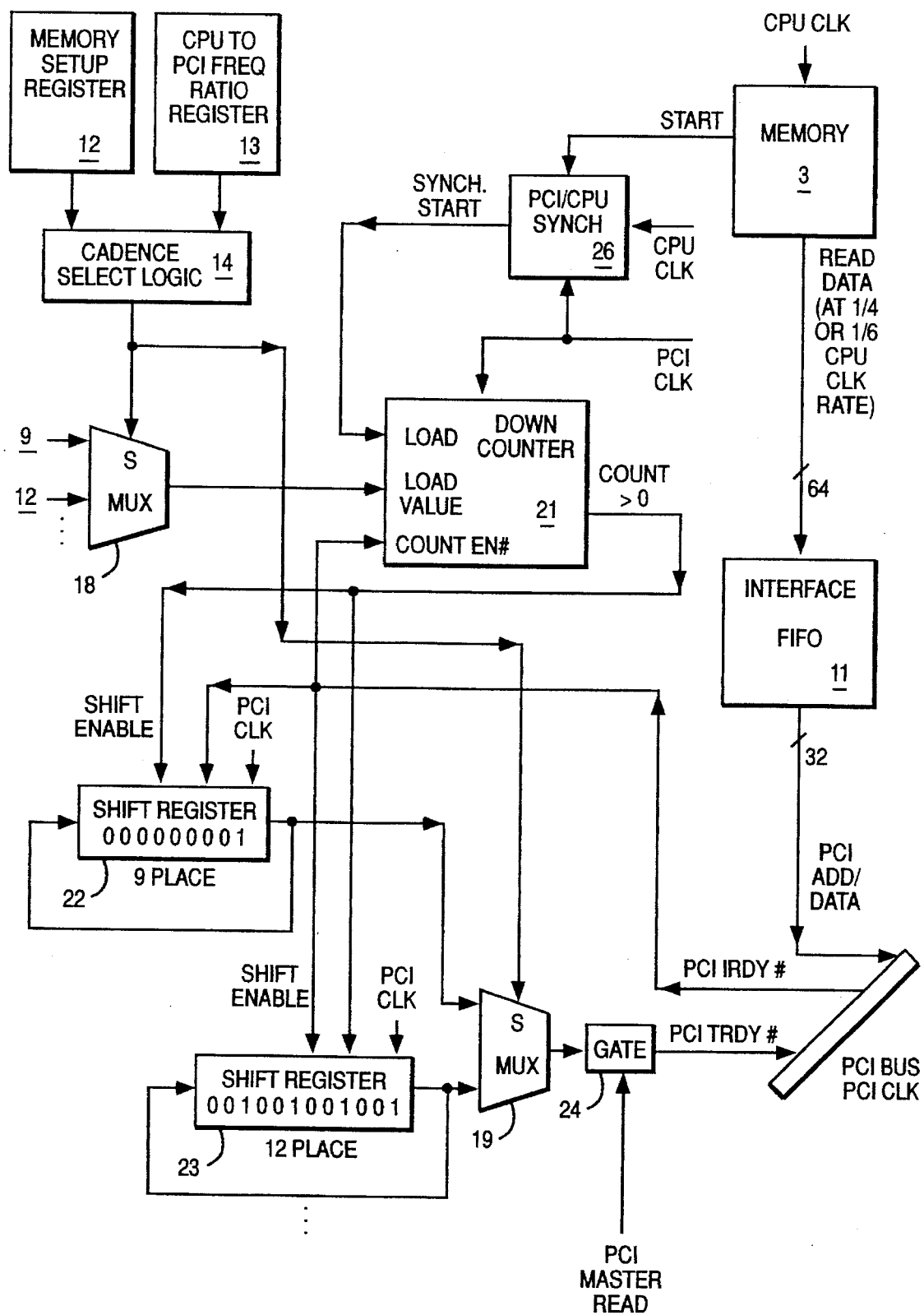
FIG. 4 depicts a functional block diagram embodiment of the selectable cadence interface according to the present invention.

FIG. 4 depicts in greater detail the bus interface of FIG. 2. The FIG. 4 embodiment again connects a 64 byte wide processor bus to a conventional 32 bit PCI bus. Timing diagrams for two corresponding cadences are detailed in FIG. 6. The timing diagrams for two different memory access latency conditions are shown. Again, the objective of the interface is to provide an optimized data transfer rate from the memory to the PCI bus during a burst read sequence.

Referring to FIG. 4, the parameter bits entered into memory set-up register 12 and CPU to PCI frequency ratio register 13 are logically combined to select a cadence in block 14. The cadence selection is used in multiplexers 18 and 19. Multiplexer 18 selects a number corresponding to the length of the cadence, while multiplexer 19 selects the actual WAIT/CONTINUE pattern corresponding to that length. The length of the cadence is loaded into down counter 21, which counter decrements in step with the PCI bus clock.

Shift registers 22 and 23 remain enabled and responsive to PCI clock signals so long as the count in counter 21, defined by the selected cadence, remains greater than zero. The actual bit pattern used to drive the TRDY# line of the PCI bus is unique for each of the shown cadences, and is enabled only when gate 24 is enabled by a PCI bus master read enable signal. Gate 24 ensures that the PCI bus is enabled only during a PCI bus master read state.

Also shown in FIG. 4 is PCI/CPU synchronization block 26. Block 26 initiates the loading of counter 21 in synchronism with the faster CPU clock immediately before the first relevant PCI clock cycle. Thereby, operation is initiated with the rising edge of the PCI clock.

Figure 5:
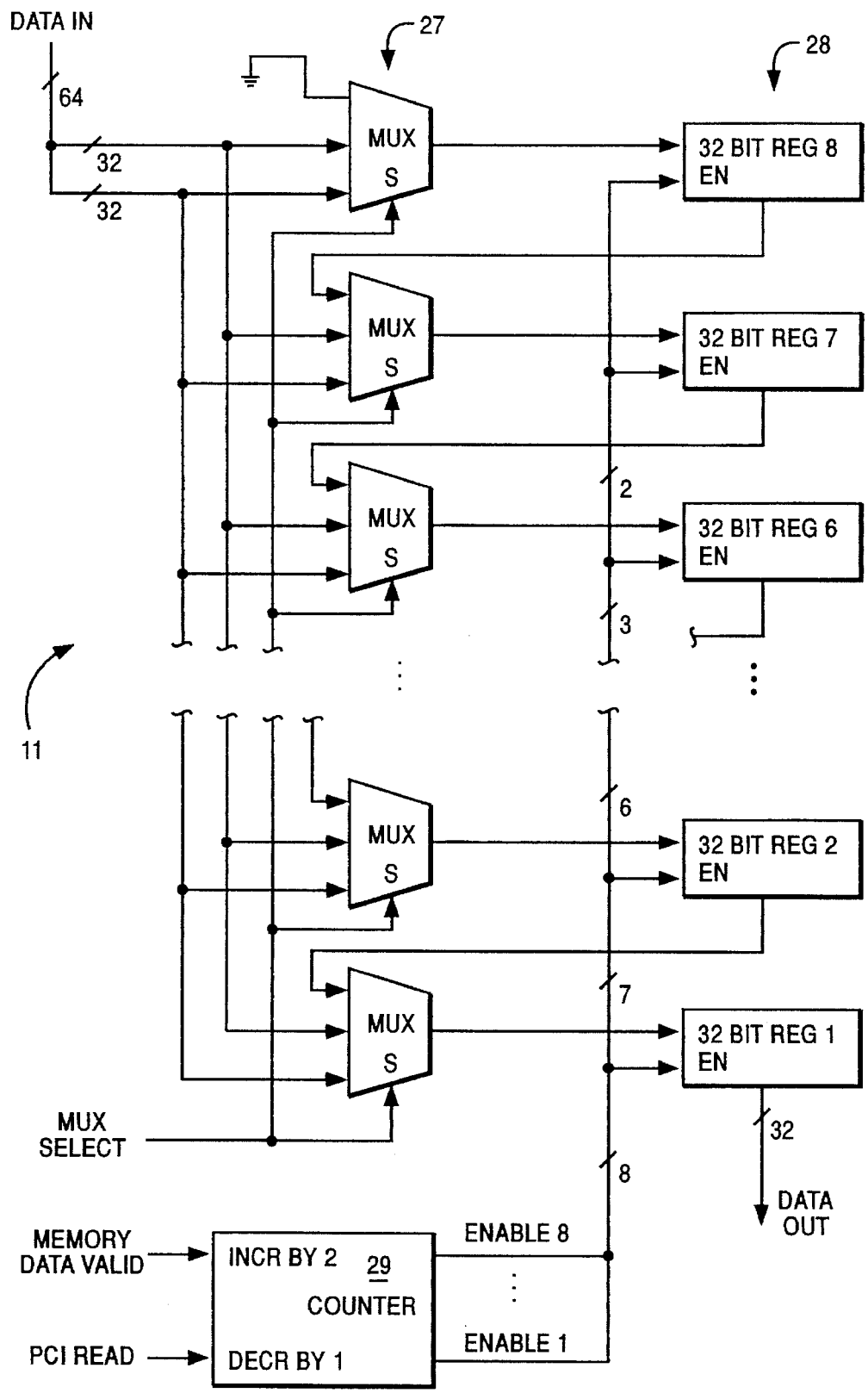
FIG. 5 schematically depicts the functional elements within a representative FIFO.

FIG. 5 depicts a preferred implementation of interface FIFO buffer 11, as appears in FIG. 4. As embodied, FIFO 11 is composed of 8 multiplexers, generally at 27, and eight 32 bit registers, generally at 28. Each time FIFO 11 is loaded with input data from memory 3 (FIG. 4), counter 29 in FIG. 5 is incremented by 2 to indicate the receipt of 2 data words.

On the other hand, each time a PCI bus read occurs, namely when a 32 bit word of output data is transferred onto the PCI bus, counter 29 is decremented by one. Multiplexers 27 ensure that each register receives data from the next adjacent register above in the FIFO stack, or receives data in from one or the other of the 32 bit wide segments of the overall 64 bit wide CPU data bus.

Figure 6:
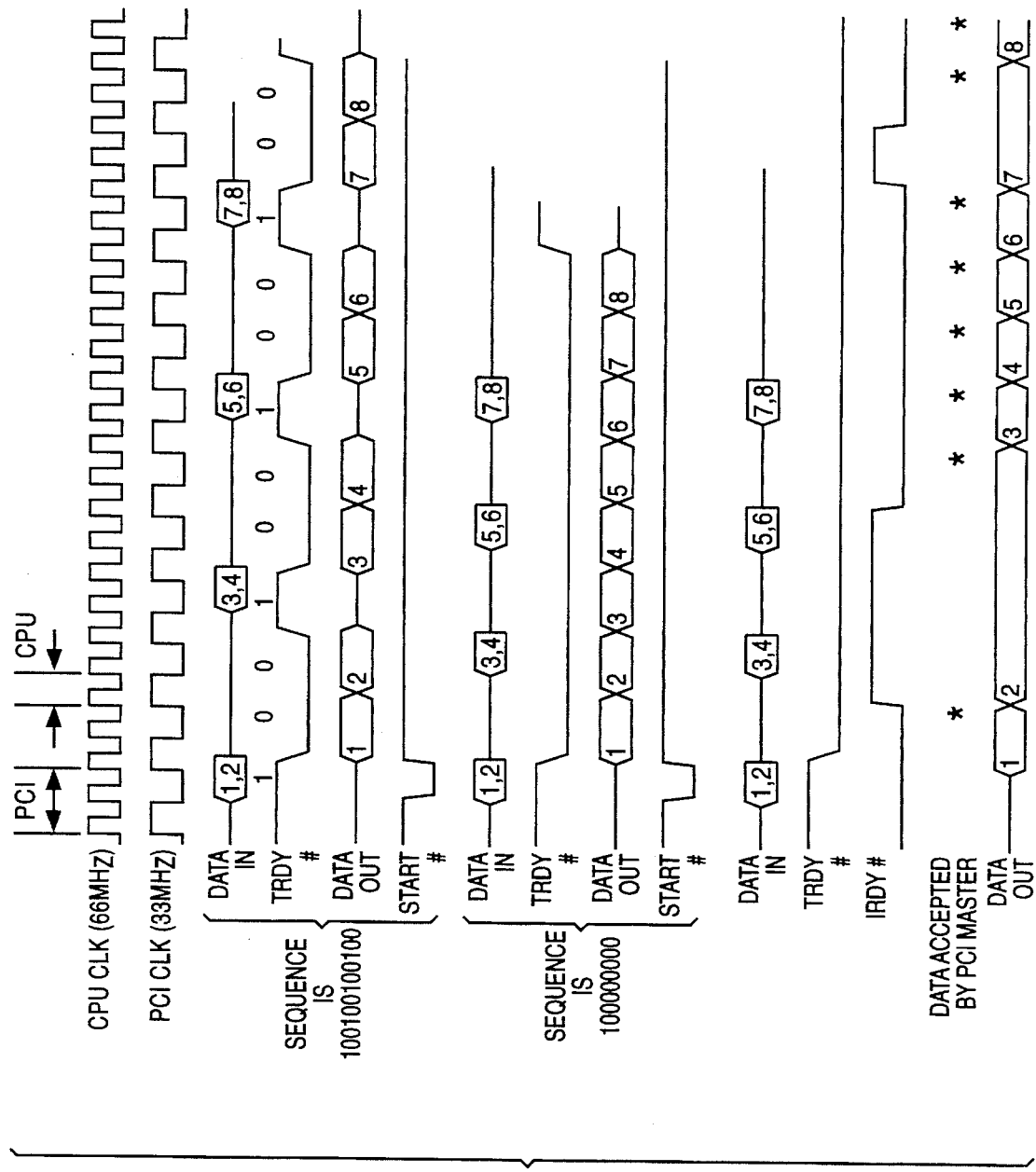
FIG. 6 is a timing diagram schematically depicting bus signals relating to various cadences.

FIG. 6 depicts the waveforms for example operations of the apparatus in FIG. 4. The first group of patterns uses the 12 place cadence as stored in shift register 23 (FIG. 4). The CPU and PCI bus widths are again, respectively, 64 and 32, Lastly, the memory access latency represents a memory read output for each 6 CPU clock cycles. Therefore, the Data In occurs in 64 bit widths at 6 CPU clock intervals.

The correspondingly defined cadence, as reflected by the TRDY# signal to the PCI bus, begins with a logical one and is followed thereafter in repetitive succession by two logical zeros and another logical one. The TRDY# pulse sequence matches the pattern in shift register 23 (FIG. 4). The Data Out appears on the PCI bus during the two successive PCI clock cycles following the Data In cycle, as reflected by the TRDY# signal.

Note that the Data In is provided during the trailing half of each PCI .clock cycle. This full utilization of each PCI clock cycle is accomplished through a synchronization with the START# signal in block 26 (FIG. 4).

This first sequence of waveforms in FIG. 6 represents an optimized burst mode read transfer between the main memory and the PCI bus master for the specified design parameters.

The middle group of waveforms represents an optimized cadence Where the memory access latency is changed to one memory read output for each CPU clock cycles. The binary sequence shown at the left to corresponds to the cadence in shift register 22 (FIG. 4). Again, the burst mode read transfer is optimized for the specified design parameters.

The last group of waveforms in FIG. 6 illustrates the modulating effects of the IRDY# line from the PCI bus, that line indicating availability of the PCI bus master to data transfer operations. Note in FIG. 4 that the PCI bus IRDY# line selectively disables down counter 21, shift register 22 and shift register 23 when the PCI bus master is not ready to receive data. The memory access latency for the last group of waveforms matches the parameters for the immediately preceding group of waveforms, namely, Where there is a memory read cycle for every 4 CPU clock cycles. However, note that the actual data transfer is effectively modulated by the IRDY# signal on the PCI bus. This extends the time needed to perform the data transfer. Therefore, though the selection of the cadence allows for optimal transfers of data between busses, the optimization remains susceptible to lesser efficiency if the PCI bus master paces the data transfer using the IRDY# line.

As shown and described with reference to FIGS. 2 and 4, the bus interface according to the present invention provides an automated and optimized apparatus for accomplishing burst mode transfers of data between busses in a digital data processing system.

Though the invention has been described and illustrated by way of specific embodiments, the apparatus and method encompassed by the invention should be interpreted to be in keeping with the breadth of the claims set forth hereinafter.

We claim:

1. In an interface system between a first data bus and a second data bus, the busses being operable at different clock frequencies, a method of providing efficient transfers of data between the busses, comprising the steps of:

storing a plurality of data transfer cadences;

determining a relative data transfer rate between the first and second busses;

selecting a transfer cadence from the plurality of cadences responsive to the determination of a relative data transfer rate; and providing pacing signals to the second bus responsive to the selected transfer cadence.

2. The method recited in claim 1 wherein the step of providing pacing signals generates transfer ready signals for devices on the second bus.

3. The method recited in claim 2, wherein the selected transfer cadence is derived from a combination of the data rate on the first bus, the data bus width of the first bus, the data rate of the second bus and the data bus width of the second bus.

4. The method recited in claim 1, further comprising the step of buffering data being transferred between the first and second busses in a FIFO type memory which is responsive to a data request signal from a device on the second bus.

5. The method recited in claim 4, wherein the selected transfer cadence is derived from a Combination of the data rate on the first bus, the data bus width of the first bus, the data rate of the second bus and the data bus width of the second bus.

6. The method recited in claim 1, wherein the selected transfer cadence is derived from a combination of the data rate on the first bus, the data bus width of the first bus, the data rate of the second bus and the data bus width of the second bus.

* * * * *

UNITED STATES PATENT AND TRADEMARK OFFICE
CERTIFICATE OF CORRECTION

PATENT NO. : 5,564,027
DATED : October 8, 1996
INVENTOR(S) : Hai Q. Bui, Sean E. Curry and Bernard C. Drerup It is certified that error appears in the above-indentified patent and that said Letters Patent is hereby corrected as shown below:

Column 5, line 34, after "each" insert --4--.
Column 5, line 33, delete "Where" and insert --where--.

Signed and Sealed this

Eighteenth Day of March, 1997

Attest:

BRUCE LEHMAN

Attesting Officer

Commissioner of Patents and Trademarks